INVENTOR
ROGER K. LEE.
BY
ATTORNEY

INVENTOR
ROGER K. LEE.

July 12, 1932.  R. K. LEE  1,867,413
BALANCING APPARATUS
Filed Nov. 19, 1929  7 Sheets-Sheet 3

INVENTOR
ROGER K. LEE.
BY
ATTORNEY

INVENTOR
ROGER K. LEE.
BY
ATTORNEY

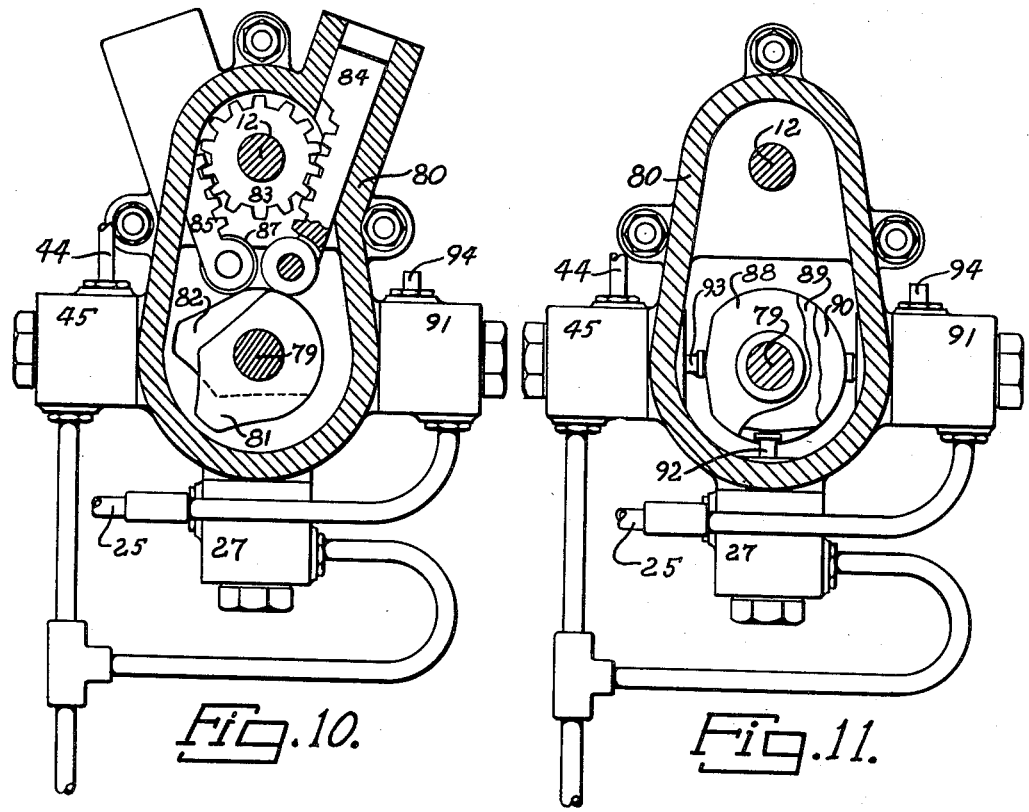
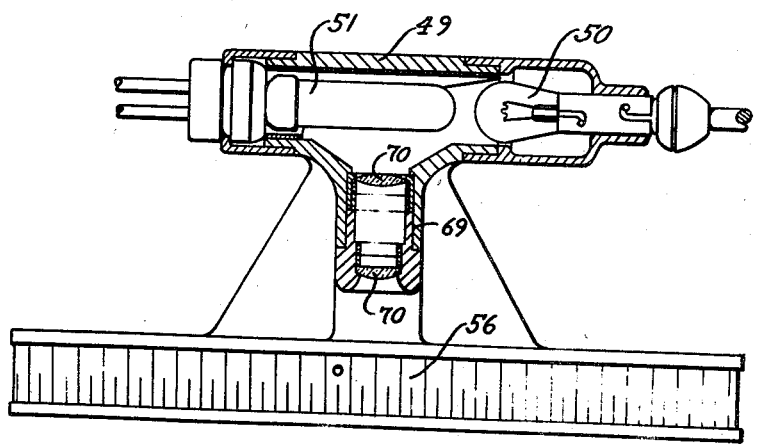

Patented July 12, 1932

1,867,413

UNITED STATES PATENT OFFICE

ROGER K. LEE, OF DETROIT, MICHIGAN, ASSIGNOR TO CHRYSLER CORPORATION, OF DETROIT, MICHIGAN, A CORPORATION OF DELAWARE

BALANCING APPARATUS

Application filed November 19, 1929. Serial No. 408,267.

This invention relates to an improved apparatus and method for correcting over-balances on articles which are subjected to rotation, particularly the crank shafts of internal combustion engines.

The main objects of this invention are to provide an improved device for accurately determining the amplitude of the over-balances at the respectively opposite ends of a crank shaft; to provide improved means in a device of this kind for determining the location of the over-balances on a shaft; and to provide an improved method for correcting, at predetermined locations on a crank shaft, for the over-balances which occur in diverse directions at the respectively opposite end portions of a crank shaft.

Further objects of this invention are to provide improved means in a device of this kind for journaling a crank shaft in substantially the same manner as it is normally supported in a crank case; to provide means for rotatably supporting a crank shaft with its central axis vertically disposed to prevent the balance of the shaft from being disturbed by flexure thereof; to provide an improved support for a crank shaft which is adapted to be freely moved by the action of the over-balance of a shaft; to provide means for alternatively pivoting one of the respectively opposite ends of said support so as to allow the free end to be moved by the over-balance of the crank shaft; to provide a driving member on said support so as to obviate the exertion of external forces thereon when the crank shaft is rotated; to provide a coupling for detachably connecting a crank shaft with said driving means which will rotate the crank shaft at a uniform angular velocity; to provide a coupling of this kind in which displacement of the axis of the crank shaft from a predetermined position by wear of the coupling is obviated; and to provide a device of this kind in which a stroboscopic indicator may be employed for accurately determining the location of the over-balance on the shaft.

An illustrative embodiment of my invention is shown in the accompanying drawings, in which:

Fig. 10 is a horizontal section taken on the line 10—10 of Fig. 9.

Fig. 11 is a horizontal section taken on line 11—11 of Fig. 9.

Fig. 12 is a transverse section taken on the line 12—12 of Fig. 2.

Figure 1:
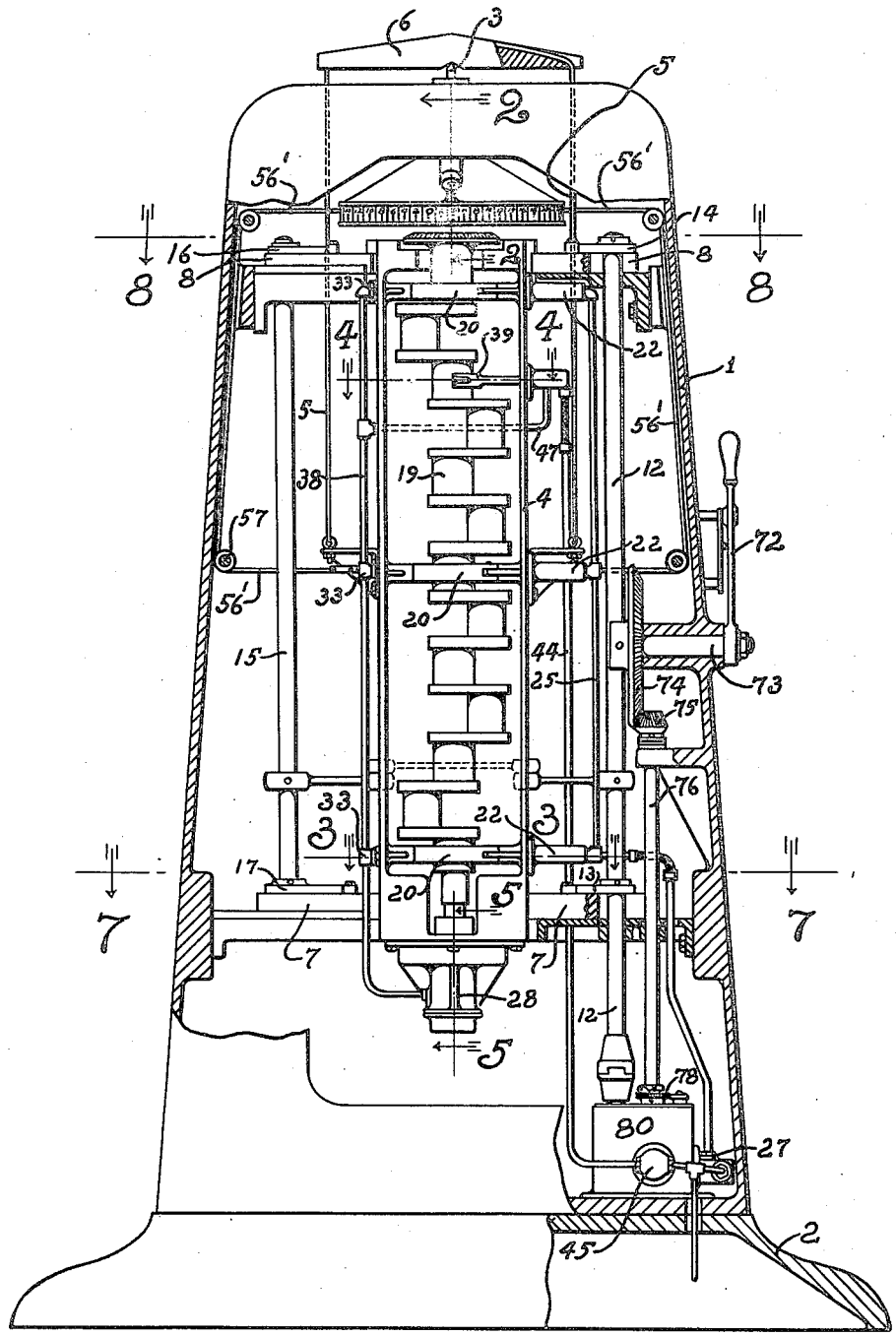
Fig. 1 is a front elevation, partly in section, of my improved balancing machine.
Figure 2:
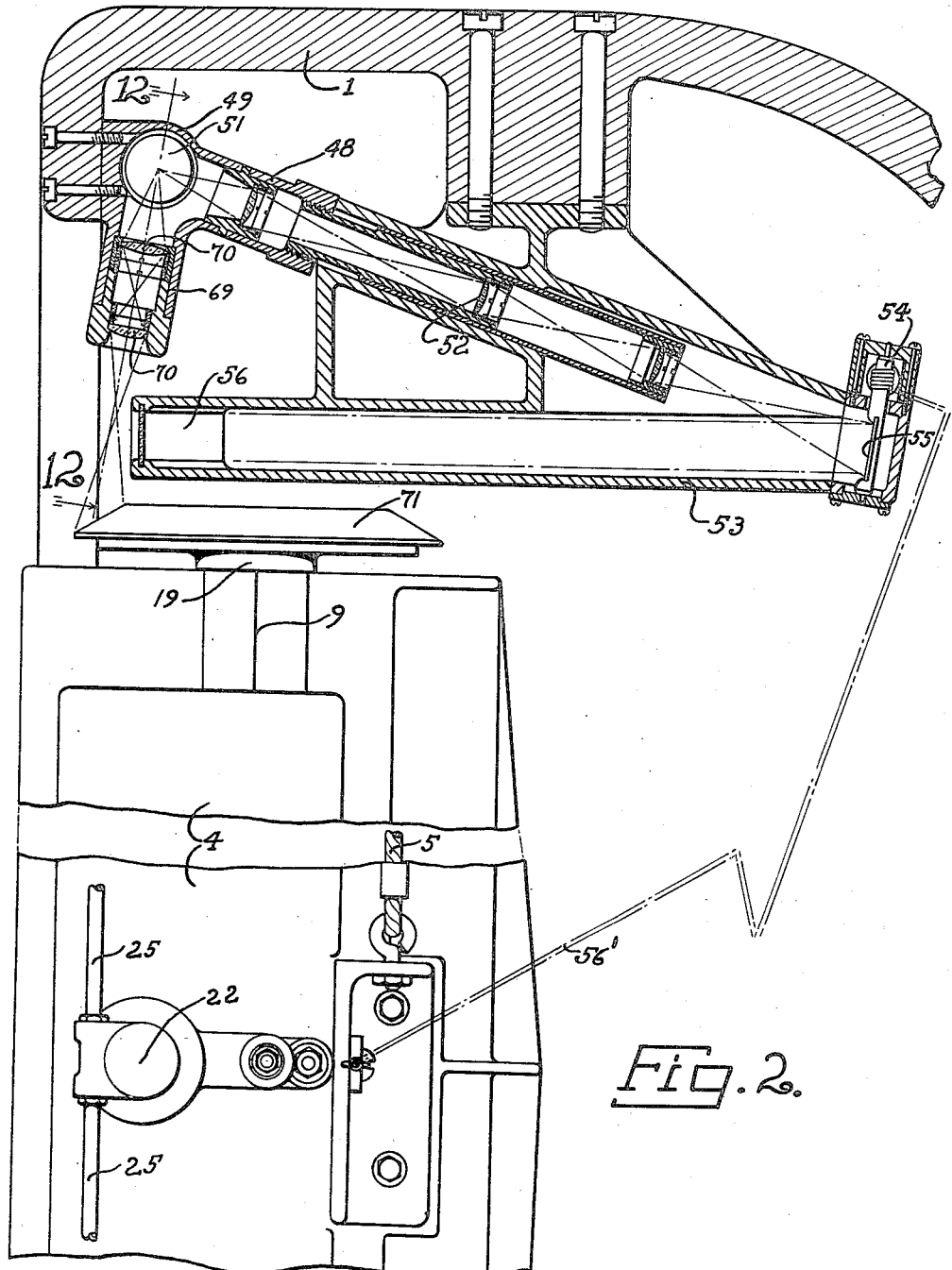
Fig. 2 is a vertical section taken on the line 2—2 of Fig. 1 showing a fragmentary view of a crank shaft support.

In the form shown, the balancing machine comprises a housing in which a casing is suspended substantially from its center of gravity. The casing includes spaced bearings for supporting a crank shaft for rotation about a vertical axis and means for rotating the shaft. Mounted on the housing at the respectively opposite ends of the casing are pairs of adjustable jaws by which either end of the casing may be pivotally held against movement relative to the housing, while the opposite end is allowed to be moved by the over-balance of the crank shaft.

Provided on the housing is a device for periodically indicating the position of the free end of the casing and crank shaft as it is moved in a definite locus during the rotation of the shaft while one end of the casing is held by one pair of clamps. This indicating apparatus comprises a scale which is calibrated in terms of the amplitude of the over-balance of a crank shaft. The positions of the free end of the crank shaft and casing are traced by flashes of light from a neon bulb which are directed upon the scale. In this manner, the limits of the movement of the chank shaft may be accurately determined.

The indicating apparatus includes a projector for directing the flashes from the neon bulb onto a dial, which is graduated radially in degrees and located on the end of the crank shaft so as to disclose the graduations on said dial by illuminating them. When the free end of the crank shaft is in a predetermined position, as for example, midway between its limits of movement, the over-balance of the shaft is exerted in a known corresponding direction. Therefore, by locating the graduation which is illuminated by that flash of light which disclosed the shaft to be midway between its limits, it is possible to accurately determine the direction in which the over-balance is exerted.

In the illustration shown, the housing 1 is mounted on a base 2 and has a knife edge 3 on its upper end from which a casing 4 is suspended by cables 5. The cables 5 extend over a rocker arm 6 and are connected at their respectively opposite ends to the sides of the casing 4 substantially in alignment with its center of gravity.

Slidably mounted on the housing 1 are upper and lower pairs of cross head members 7 and 8, respectively, which have V shaped notches for receiving correspondingly shaped projections 9 and 10 on the upper and lower ends of the casing 4, respectively. The faces of the notches are lined with a pliable rubber composition 11 by which the ends of the casing are pivotally or yieldably held against movement relative to the housing.

Figure 8:
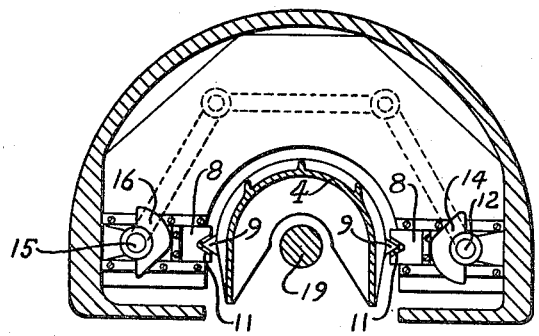
Fig. 8 is a horizontal section taken on the line 8—8 of Fig. 1.
Figure 7:
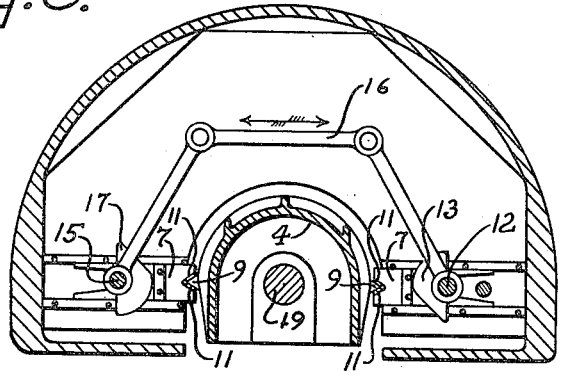
Fig. 7 is a horizontal section taken on the line 7—7 of Fig. 1.
Figure 13:
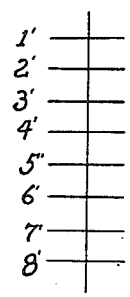
Fig. 13 is a graphical illustration of a crank shaft showing the crank arms thereof diagrammatically.

Journaled in the housing 1 is a vertically extending shaft 12 having upper and lower cams 13 and 14 thereon for operating the cross head blocks 7 and 8 of the right hand side of the housing, as viewed in Figs. 7 and 8. The shaft 12 is connected to a vertical shaft 15 on the left hand side of the housing, as viewed in Fig. 1, by a series of links 16. The shaft 15 carries an upper and lower cam 16 and 17, respectively, with co-act with the cross head blocks 7 and 8 of the left side of the housing.

The lower end of the shaft 12 is operatively connected with a driving mechanism by means of which it is oscillated between predetermined limits so as to oscillate the cams 13, 14, 16 and 17 in unison. The upper and lower pairs of cams are designed to urge both the upper and lower pairs of cross head blocks inwardly when the shaft 12 is in a predetermined position so as to firmly clamp both the upper and lower ends of the casing against movement relative to the housing. When the shaft 12 is in another predetermined position, the lower pair of cams are adapted to release the lower pair of cross head blocks so as to free the lower end of the casing while the upper end theerof is firmly held.

By oscillating the shaft 12 to the next predetermined position, the lower pair of cams drive the cross head block 7 inwardly and the upper pair of cams release the upper pair of cross head blocks.

Figure 3:
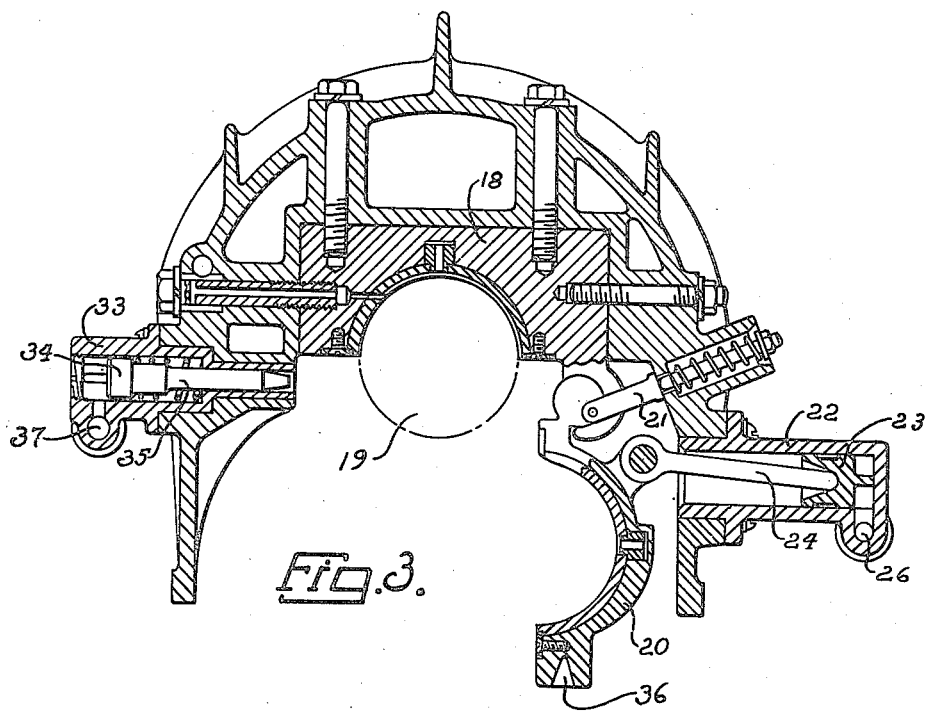
Fig. 3 is a horizontal section taken on the line 3—3 of Fig. 1.

Provided in the casing 4 are spaced stationary bearing members 18 for receiving the journals of a crank shaft 19. These bearing members are suitably arranged for rotatably supporting the crank shaft 19 with its axis in a vertical position and in a manner substantially identical to the way in which such crank shafts are normally supported in the crank case of an internal combustion engine. Pivotally mounted on the block 18, shown in Fig. 3, is a movable bearing jaw 20, which is normally urged to an open position by a spring operated plunger 21. The movable bearing members 20 are provided with pneumatic actuating mechanism for rotating them to a closed position, which comprises a cylinder 22, piston 23 and connecting rod 24. In the illustration shown, there are provided three such bearings, one at each end of the casing 4 and one intermediate its ends. All three bearings are substantially identical in construction and they are all supplied with fluid pressure by a common tube 25 which is connected at one end with an inlet 26 in the cylinder 22 and at the other end with a valve 27.

Mounted on the rear end of the casing 4 is an air motor 28 having a pinion 29 thereon which is meshed with a gear 30 located substantially in alignment with the lower end of the crank shaft 19. The gear 30 is rigidly secured to a shaft 31 by a coupling, which has a socket 32 for receiving the lower end of the crank shaft 19. Threaded in the socket 32 is a set screw 33' which extends into a slot in the lower end portion of the crank shaft 19 so as to assure rotation of the shaft in unison with the socket. Mounted in the socket 32 is a rubber friction pad 31' upon which the lower extremity of the crank shaft is seated. The frictional engagement between the crank shaft and pad may be relied upon to rotate the crank shaft if desired.

Locking mechanism, comprising a cylinder 33, plunger 34 and pin 35, is mounted on the casing 4 in close proximity to each bearing member 18 thereof. The pin 35 of the locking mechanism is adapted to extend into an aperture 36 in each movable bearing member 20 so as to secure the members 20 in a closed position while the shaft 19 is being rotated. Each cylinder 33 has an inlet 37 which communicates with a pipe 38, having one extremity in communication with the inlet of the air motor 28 so as to simultaneously apply the locks and start the motor 28.

Figure 4:
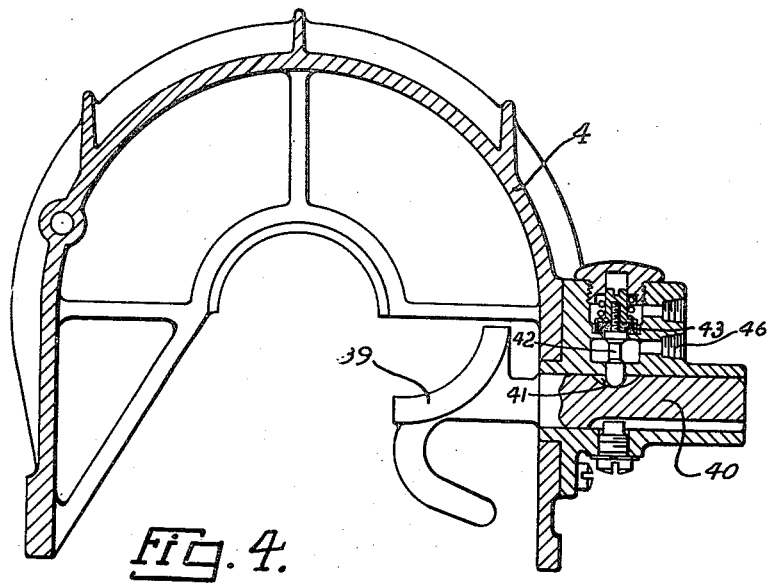
Fig. 4 is a horizontal section taken on the line 4—4 of Fig. 1.
Figure 5:
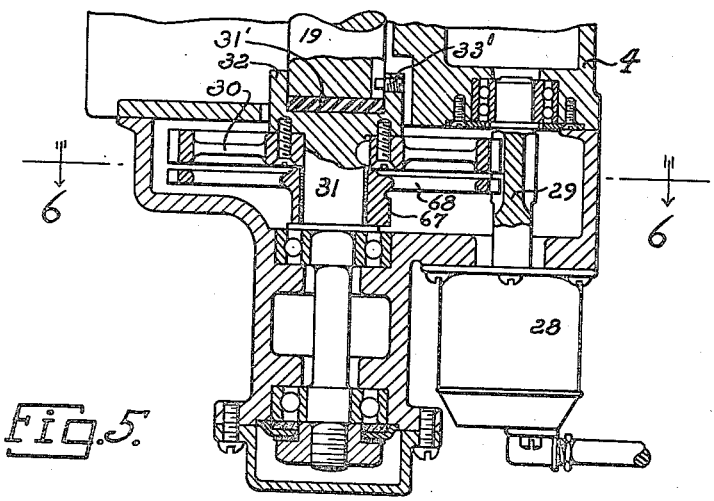
Fig. 5 is a vertical section taken on the line 5—5 of Fig. 1.

A manually operable guard 39 is slidably mounted in the casing 4, as shown in Fig. 4. This guard comprises a shank 40, having a depression 41 therein for receiving a valve stem 42 into which the valve stem 42 is adapted to extend when the guard 39 is retracted for closing the valve 43. The valve 43 communicates with one end of a pipe 44, which is connected at its other end to a control valve 45. The outlet 46 of the valve 43 is connected to the pipe 38 by a pipe 47. By this construction, the safety valve 43 controls the supply of fluid under pressure to the locks by which the movable bearing members are held in closed position and to the air motor 28 so that when the guard is in the retracted position shown in Fig. 4, the motor is deenergized and the locks are released. With this construction, the crank shaft cannot be released from its bearings while the motor 28 is operating.

The indicating mechanism comprises a substantially T shaped tube 48 having a cross member 49 in which an ordinary electric bulb 50 and a neon light bulb 51 are mounted. The tube 48 has several spaced projecting lens 52 therein for directing the rays of ordinary and neon light in a predetermined path. Pivotally mounted at the center of a hollow sector 53 is a spindle 54, which carries a mirror 55. A cord 56' is secured at its respectively opposite ends to the opposite sides of the casing 4 substantially in line with its center of gravity and is guided rearwardly over pulleys 57. The intermediate portion of the cord 56' is wrapped several turns around the spindle 54 so as to oscillate the mirror 55 by the movement to which one end of the casing is subjected as a result of the over-balance of the crank shaft 19 when the latter is rotated while the clamps at one end of the casing are released.

The beams of light from both the bulbs 50 and 51 are directed upon the mirror 55 by the projecting lens 52 and are reflected forwardly by the mirror. Slidably mounted on the front side of the sector 53 is a frosted translucent panel 56 upon which the beams of light are projected. The panel 56 is graduated in terms of amplitude of over-balance by a method hereinafter described. These graduations are arranged in the form of a scale, having a zero point intermediate its ends from which indicia representing increasing amplitudes extend in opposite directions, as shown in Fig. 1. By shifting the scale until the extremities of ordinary beams of light are equal distant from the zero point, the amplitude of the resultant may be conveniently determined.

Figure 6:
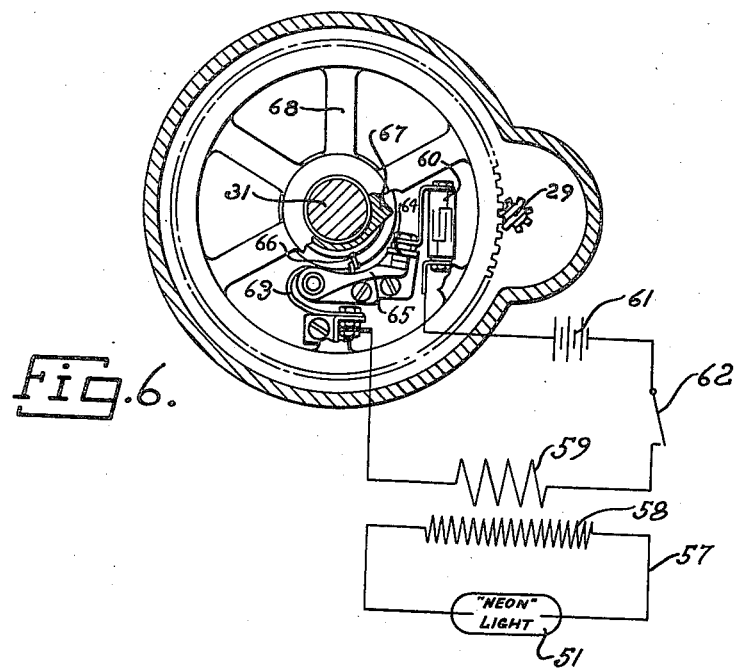
Fig. 6 is a horizontal section taken on the line 6—6 of Fig. 5 showing a diagrammatic illustration of a neon light circuit.

The neon light bulb 51 is electrically connected in a secondary circuit 57, shown in Fig. 6, which includes a secondary coil 58. Located in relative proximity to the secondary coil is a primary coil 59, which is electrically connected in a primary circuit which includes a condenser 60, a source of electricity 61, a control switch 62 and a circuit breaker 63. The circuit breaker 63 comprises a stationary contact 64, a movable contact 65 and a lug 66 by which the movable contact member 65 is oscillated. The lug 66 is engaged by a cam 67 on a gear 68, which is journaled on the shaft 31. There is one more tooth on the gear 68 than on the gear 30, by which the shaft is rotated, and the teeth of the gear 68 are meshed with the pinion 29 so that as the pinion 29 drives the shaft through one complete revolution and through substantially two degrees of the next revolution, the gear 68 is rotated only through one complete revolution. In this manner the primary circuit of the neon light is broken once during every 362 degrees rotation of the crank shaft 19.

When the primary circuit of the neon lighting system is opened, an electro-motive force is induced in the secondary coil 58 causing a flash to be produced by the neon light bulb 51. This flash is projected, along with the beams of ordinary light, onto the mirror 55 and ultimately upon the frosted panel 56. The flash of neon light is simultaneously projected through a tube 69 by lens 70 onto a disc 71, which is graduated in degrees and located on the upper end of the crank shaft 19. The occurrence of the flash of neon light two degrees after the shaft has been rotated through every complete revolution, causes the movement of the free end of the crank shaft and casing to be traced by progressively moving flashes on the frosted panel 56. The simultaneous flashes on the dial 71 enables an operator to locate a mark on the dial when the free end of the crank shaft and casing are in a predetermined position, for example, midway between its limits of movement.

Figure 9:
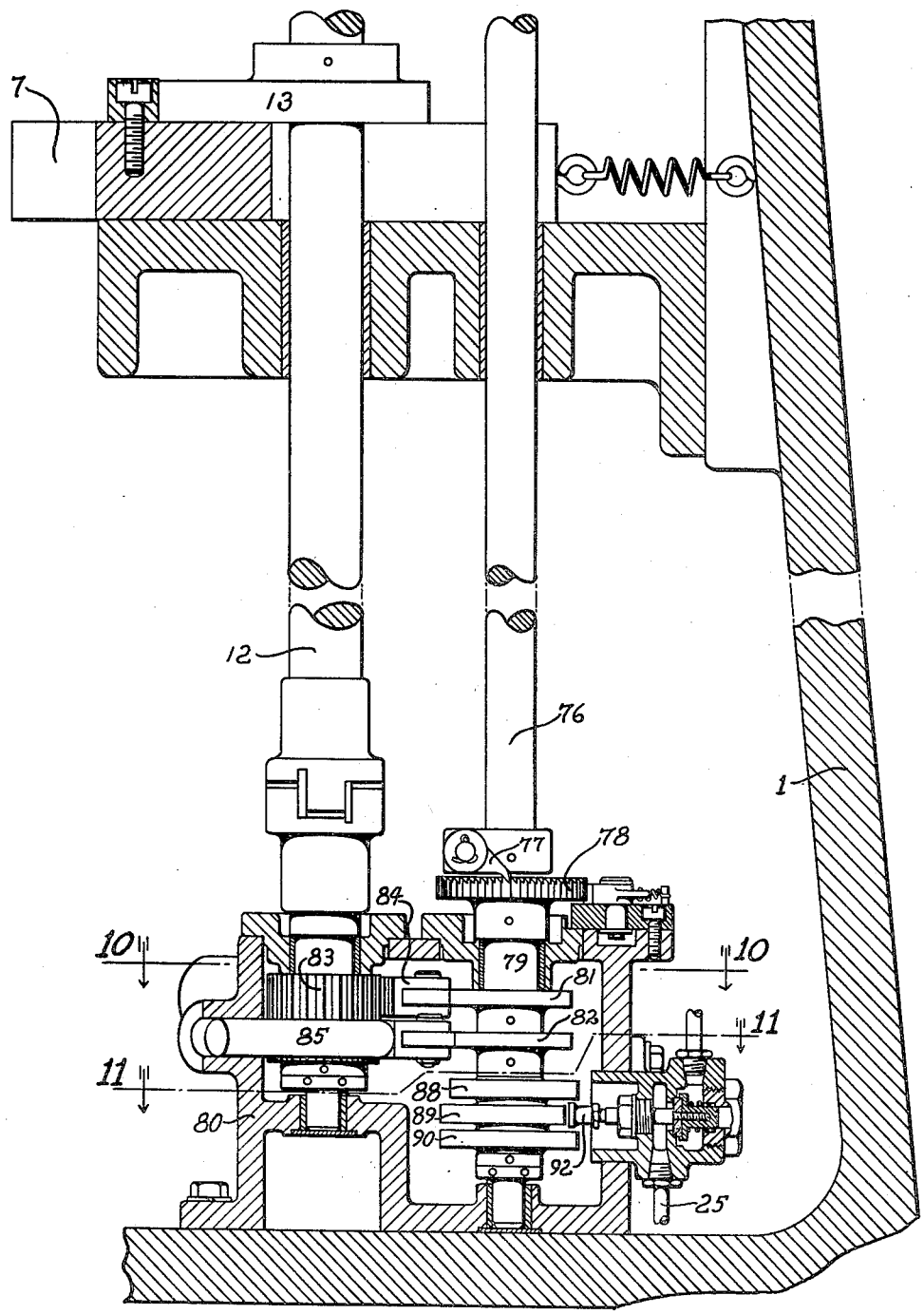
Fig. 9 is a vertical section of the indicating apparatus for actuating various members of the device in a predetermined sequence.

By means of the control mechanism shown in Fig. 9, all operations of the pneumatically and mechanically actuated parts of the machine may be controlled by a single hand lever 72, which is rigidly secured to a shaft 73 journaled in the side of the housing 1. Mounted on the inner end of the shaft 73 is a bevel gear 74 which meshes with a bevel pinion 75 on the upper end of a vertical shaft 76. The lower end of the shaft 76 carries a pawl 77 which operates upon a ratchet wheel 78 on the upper end of a cam shaft 79.

The cam shaft 79 is journaled in a housing 80 and it is provided with cams 81 and 82 by which oscillation of the shaft 12 is controlled. A pinion 83 is rigidly fixed on the lower end of the shaft 12 in meshed relation with the teeth of a pair of rack bars 84 and 85, which are slidably mounted in the housing 80, as shown in Fig.

10. Rotatably mounted on the inner ends of the rack bars 84 and 85 is a pair of rollers 86 and 87 which ride upon the peripheries of the cams 81 and 82, respectively. The cams 81 and 82 are arranged relative to each other and are constructed so as to urge one rack bar outwardly at a time, the other rack bar being permitted to move inwardly, thereby oscillating the shaft 12 through a predetermined arc.

Mounted on the lower end portion of the shaft 79 are adjacent cams 88, 89, and 90, by means of which the valves 45, 27 and an exhaust valve 91, respectively, are controlled. The peripheries of these cams are formed to open and close the valves in a predetermined sequence hereinafter set forth.

In operation, the crank shaft 19 is placed in the casing 4 with its journals seated in the stationary bearing blocks 18 thereof, while the casing is secured against movement at both ends by the upper and lower pairs of clamping jaws 8 and 7, respectively. The guard 39 is then manually extended until its bearing face engages the journal of the crank shaft with which it registers. Extension of the guard conditions the valve 34 for admitting air to the motor 28 and locking mechanism 33.

The first operation of the hand lever 72 brings the periphery of the cam 89 into engagement with a valve stem 92 of the valve 27, thereby opening the valve 27 and admitting air under pressure to the cylinders 22. This action causes the movable bearing members 20 to be rotated to a closed position.

The second stroke of the hand lever 72 brings the periphery of the cam 88 into engagement with a valve stem 93 of the valve 45 and opens the latter so as to admit air to the cylinders of the locking apparatus and to the motor 28 simultaneously. The pins 35 of the locking apparatus are extended into the apertures 36 of the movable bearing members 20 and rotation of the shaft is started.

The third operation of the hand lever 72 rotates the pinion 83 in a clock-wise direction, as viewed in Fig. 10. This action rotates the cams 13 and 17 of Fig. 7 in a corresponding direction so as to release the clamping members 7 and free the lower end of the casing 4.

With the crank case suspended substantially from its center of gravity and clamped at its top end, the over-balance at the lower end of the crank shaft causes the free ends of the crank shaft and casing to move in a definite path substantially circular in shape when the shaft is rotated. This movement of the casing oscillates the mirror 55 and causes a beam of ordinary light on the frosted panel 56 to reciprocate between limits which correspond with the limits of movement of the casing 4 and crank shaft 19. The shiftable panel is then adjusted so as to place the zero graduations thereon midway between the limits of the beam of light. The operator is then able to determine the amplitude of the over-balance which produces the movement of the casing by reference to the scale of the panel 56 which is calibrated to read in terms of amplitude.

The flash of neon light is projected simultaneously upon the frosted panel 56 and dial 71 during each 362 degrees of rotation of the crank shaft 19, thereby producing a progressively moving flash on the frosted panel 56 which corresponds in position with the location of the free ends of the crank shaft and casing in its path of movement. When the flash of neon light on the frosted panel 56 registers with the zero mark thereon, the free ends of the casing and crank shaft are located midway between the limits of their movement. By observing the graduations of the dial with which the flash registers when the crank shaft is midway between the extremities of its path, it is possible to locate on the shaft the position of the over-balance of the lower end of the crank shaft.

A fourth stroke of the hand lever 72 applies the lower pair of clamping members and the next or fifth stroke of the lever releases the top pair of clamping members. Readings on both the scale of the panel 56 and the dial 71 are taken in the above manner to determine the amplitude and direction of the over-balance of the upper end of the crank shaft. The sixth stroke of the hand lever 72 oscillates the shaft 12 and the cams 14 and 16 in a clock-wise direction to the positions shown in Fig. 8, thereby applying the clamps 8 and securing the top of the casing against movement.

The next and last stroke of the hand lever 72 brings the cams 88, 89 and 90 into positions which allow the valves 45 and 27 to close, thereby cutting off the supply of air to the cylinders 22 and 33 and to the air motor 28. This action retracts the locking pins 35 and rotates the movable bearing members 20 to open positions. During this last movement of the hand lever 72 the cam 90 opens the exhaust valve 91, permitting the pressure in the system to escape through an outlet 94. The device is in this way conditioned for the removal of one crank shaft and the reception of another and the parts are in the position in which they were disposed at the beginning of the operating cycle.

In calibrating the scale of the frosted panel 56, a perfectly balanced crank shaft is mounted in the machine and thrown out of balance by removing known quantities of metal from the various crank arms represented by numerals 1' to 8', inclusive, at fixed distances from the vertical axis of the shaft. The same effect may be produced by adding known weights to the various arms at fixed distances from the vertical axis of the shaft if desired. A test is made after each modification of the respective crank arms so as to determine the effect of each known modification by observing the limits of the flash which is projected upon the panel. Any desired number of modifications may be made in each of the crank arms or in selected crank arm, and the effect of each change is recorded on the panel 56 in ounce inches square.

When an unbalanced crank shaft has been tested, the data obtained may, for example, be as follows: 15° and 10 ounce inches square for the top end and 120° and 5 ounce inches square for the bottom end.

With this information, the unbalanced crank shaft may be corrected by determining the amount of metal which is required to be removed from two or more of the respective crank arms. This calculation may be accomplished graphically, as illustrated in Fig. 14, or trigonometrically if desired.

Figure 14:
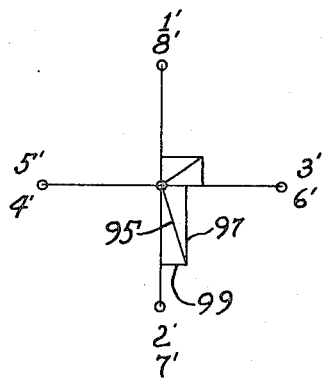
Fig. 14 is a top end view of the graphical illustration shown in Fig. 13.

In Fig. 14, the arrow 95 represents the resultant of the over-balance at the top of the crank shaft which has an amplitude of 10 ounce inches square and a direction of 15°. This resultant may be corrected for by removing proper quantities of metal from the crank arms 2' and 3', the amounts being determined by graphically resolving the resultant 95 into its coordinates. In the illustration, the line 99 represents the correction which is to be made in the arm 3' and the line 97 represents the correction which is to be made in the arm 2'. The 5 ounce inches square resultant of the bottom portion of the crank shaft may be resolved between the arms 6' and 8' of the bottom part of the crank shaft in the same manner.

With this improved method of balancing a crank shaft, accurately calculated quantities of metal may be removed from the respective crank arms so as to overcome the over-balance thereof. In practice, a drill of known diameter may be used for removing the metal from the crank arms and for convenience a chart may be employed to show the effects in ounce inches square of drilling to predetermined depths in the various crank arms to a fixed distance from the axis of the crank shaft.

Although but one specific embodiment of this invention has herein been shown and described, it will be understood that various changes, including the size, shape and arrangement of parts, may be made without departing from the spirit of my invention and it is not my intention to limit its scope other than by the terms of the appended claims.

What I claim is:

1. A device of the class described including a support, a rocker bar fulcrumed on said support, means for supporting an article located below said rocker bar, elements depending from said rocker bar and pivotally attached to said means for normally supporting the latter in stable equilibrium, and apparatus for measuring the amplitude of over-balance of said article by the displacement to which said means is subjected by said over-balance.

2. A device of the class described including a support, a member swingably mounted on said support, means on said member for rotatably supporting an article, means for alternatively holding the respectively opposite ends of said member in a fixed relation to said support, the remaining length of said member being movable in a substantially conical path, and apparatus for measuring the amplitude of over-balance of said article with respect to its axis of rotation by the displacement to which said means is subjected by said over-balance.

3. A device of the class described including a support, a member suspended from said support, means carried by said member for rotatably supporting a crank shaft for rotation relative to said member, means on said support for alternatively restraining one end of said member against rotation and movement relative to said support, and apparatus for measuring the amount said crank shaft is over-balanced with respect to its axis of rotation at the free end of said member by the displacement to which said means is subjected by said over-balance.

4. A device of the class described including a support, a member suspended from said support, means carried by said member for rotatably supporting a crank shaft for rotation relative to said member, means on said support for alternatively restraining one end of said member against rotation and movement relative to said support, and a member for determining the location on said shaft at which it is over-balanced.

5. A device of the class described including a support, a member suspended from said support, means carried by said member for rotatably supporting a crank shaft for rotation relative to said member, means on said support for alternatively restraining one end of said member against rotation and movement relative to said support, apparatus for measuring the amount said crank shaft is over-balanced with respect to its axis of rotation at the free end of said member by the displacement to which said member is subjected by said over-balance, and means for determining the location on said shaft at which it is over-balanced.

6. A crank shaft balancing machine including a housing having a knife edge thereon, a casing in said housing, means attached to said casing in close proximity to its center of gravity and suspended from said knife edge for supporting said casing, bearings in said casing for rotatably supporting a crank shaft for rotation relative to said casing, said bearings being adapted to support said crank shaft in substantially the same manner as it is normally supported in a crank case, driving means on said casing for rotating said crank shaft, apparatus for measuring the amplitudes of the resultants of the over-balances at the end portions of said crank shaft while the latter is rotated, and means for locating the positions of said over-balances.

7. A crank shaft balancing machine including a housing having a knife edge thereon, a casing in said housing, means attached to said casing in close proximity to its center of gravity and suspended from said knife edge for supporting said casing, bearings comprising a stationary member and a removable jaw in said casing for supporting a crank shaft, pneumatic means for opening and closing said removable jaws, means for rotating said shaft, and apparatus mounted on said casing and housing, respectively, for measuring the amplitude and determining the location of the over-balance on said crank shaft.

8. A crank shaft balancing machine including a housing, a support in said housing, means suspended from said housing and attached to said support in close proximity to its center of gravity for suspending said support from said housing, bearings in said support comprising a stationary member and a movable jaw for rotatably supporting a crank shaft, a motor on said housing for rotating said shaft, actuating means for opening and closing said movable jaws, a lock on each of said stationary jaws for securing the movable jaw thereof in a closed position, and control mechanism for said motor and locking mechanism adapted to deenergize said motor when said locks are released.

9. A crank shaft balancing machine including a housing and a depending suspension element, a support attached substantially at its center of gravity to said element, bearings in said support comprising a stationary member and a movable jaw for rotatably supporting a crank shaft, a pneumatic motor on said housing for rotating said shaft, pneumatic actuating means for opening and closing said movable jaws, a pneumatic lock on each of said stationary jaws for securing the movable jaw thereof in a closed position, and control mechanism for said pneumatic motor and locking mechanism adapted to deenergize said motor when said locks are released.

10. A crank shaft balancing machine including a support and a depending suspension element, a casing attached to said element and suspended from said support, means in said casing for rotatably supporting a crank shaft, means on said casing for rotating said crank shaft, means on said housing for alternatively securing one of the respectively opposite ends of said casing against movement by the over-balance of said crank shaft, apparatus on said housing for measuring the amplitude of the over-balance of said crank case at the free end of said housing, and mechanism for locating a mark on said crank shaft which is a known related proximity to the over-balanced part thereof.

11. A crank shaft balancing machine including a support and a depending suspension element, a casing attached to said element and suspended from said support, means in said casing for rotatably supporting a crank shaft having an over-balance relative to its axis of rotation, means on said casing for rotating said crank shaft, means on said housing for alternatively securing one of the respectively opposite ends of said casing against movement by said over-balance, apparatus on said housing for measuring the amplitude of said over-balance at the free end of said housing, and stroboscopic means for locating a mark on said crank shaft in related proximity to the position of said over-balance so as to enable a correction to be made for eliminating said over-balance.

12. A crank shaft balancing machine including a support and a suspension element, a casing attached to said element and suspended from said support, means in said casing for rotatably supporting a crank shaft having an over-balance relative to its axis of rotation, means on said casing for rotating said crank shaft, means on said housing for alternatively securing one of the respectively opposite ends of said casing against movement, and manual actuating mechanism for operating said securing means in a timed relation so as to allow one of the respectively opposite ends of said casing to be moved by said over-balance and then the other.

13. A device of the class described including a support and a suspension element, a casing attached to said element and suspended from said support, means in said casing for rotatably supporting an article, means for securing one end of said casing against movement by the over-balance of said article relative to its axis of rotation, the other end of said casing being free to move under the action of said over-balance, apparatus connected with said casing for indicating the limits of movement of a point thereof in terms of amplitude of the over-balance of said article, and mechanism for locating a mark on said article which is in a known related proximity to the over-balanced part thereof when said point is in a predetermined position.

14. A device of the class described including a support having spaced pivots, a member extending between said pivots and restrained at one end thereby so as to revolve about said pivots, means carried by said member for rotatably supporting an article having an over-balance with respect to its axis of rotation, means for rotating said article, the free end of said pivotally mounted member being movable by said over-balance, apparatus on said support operatively connected with said pivotally mounted member adapted to indicate the limits of movement of said free end in terms of the amplitude of said over-balance, and mechanism for locating a point on said article when said free end is midway between said limits for determining the location of the over-balanced part of said article.

15. A device of the class described including a support having spaced pivots, a member extending between said pivots and restrained at one end thereby, means carried by said member for rotatably supporting an article having an over-balance with respect to its axis of rotation, means for rotating said article, the free end of said pivotally mounted member being movable by said over-balance during rotation of said article, apparatus on said support operatively connected with said pivotally mounted member adapted to indicate the limits of movement of said free end in terms of the amplitude of said over-balance, and means comprising a stroboscope for determining the location of the over-balanced part of said article.

16. A device of the class described including a support having spaced pivots, a member extending between said pivots and restrained at one end thereby so as to revolve about said pivots, means carried by said member for rotatably supporting an article having an over-balance with respect to its axis of rotation, means for rotating said article, the free end of said pivotally mounted member being movable by said over-balance during rotation of said article, a reflector operatively connected with said member adapted to move in unison therewith, illuminating means comprising a source of light and means for directing light upon said reflector, a translucent member for receiving reflected rays of light from said reflector, graduations on said translucent member adapted to indicate the limits of movement of the free end of said pivoted member in terms of the amplitude of said over-balance, and means for determining the location of said over-balance.

17. A device of the class described including a support having spaced pivots, a member extending between said pivots and restrained at one end thereby so as to revolve about said pivots in a continuous path, and means carried by said member for rotatably supporting an article having an over-balance with respect to its axis of rotation, means for rotating said article, the free end of said pivotally mounted member being movable by said over-balance during rotation of said article, a reflector operatively connected with said member adapted to move in unison therewith, illuminating means comprising a source of light and means for directing light upon said reflector, a translucent member for receiving reflected rays of light from said reflector for indicating the limits of movement of said free end, a member shiftably mounted on said translucent member having a pair of scales thereon calibrated in terms of the amplitude of said over-balance, said member being shiftable for positioning the zero point of said scales midway between said limits of movement, a disc having radial graduations thereon mounted on the free end of said article, and means on said support for flashing a progressively moving light on the calibrations of said shiftable member and a fixed flash of light on the graduations of said disc for disclosing the radial graduation of said disc with which said over-balance registers when the free end of said pivoted member is midway between said limits.

18. A crank shaft balancing device including a support having a knife edge, a casing, means attached to said casing in close proximity to its center of gravity and suspended from said knife edge, means for alternatively pivotally holding one of the ends of said casing against movement relative to said support, means in said casing for rotatably supporting a crank shaft having an over-balance, means on said casing for rotating said crank shaft, the free end of said casing being movable under the action of said over-balance during rotation thereof, a graduated scale on said support, means mounted on said support for indicating the limits of the movement of said casing, a disc on said shaft having radial graduations thereon, apparatus for flashing rays of light on said scale which correspond in position with the position of said casing for determining when said casing is midway between said limits, and means for simultaneously directing said flashes on said disc for indicating a graduation of said disc which is in a known related proximity to the over-balanced part of said crank shaft when said casing is midway between said limits.

19. A device of the class described including a support having a pair of opposed pivot elements, a member extending between said pivot elements and restrained at one end thereby, the unrestrained length of said member being revoluble about a vertical axis, and means carried by said member for rotatably supporting an article having an over-balance with respect to its axis of rotation, means for rotating said article, the free end of said pivotally mounted member being movable by said over-balance during rotation of said article, a reflector operatively connected with said member adapted to move in unison therewith, illuminating means comprising a source of light and means for directing light upon said reflector, a translucent member for receiving reflected rays of light from said reflector, and graduations on said translucent member adapted to indicate the limits of movement of the free end of said pivoted member in terms of the amplitude of said over-balance.

20. A crank shaft balancing machine including a casing having means for rotatably supporting a crank shaft having an over-balance with respect to its axis of rotation, a support for said casing, means for suspending said casing from said support, said casing being susceptible to movement by said over-balance during rotation of said crank shaft, a scale on said support, a graduated member on said crank shaft, and apparatus for flashing rays of light on said scale which correspond in position with the position of said casing and simultaneously illuminating said graduated member for locating a mark on said member when said casing is in a predetermined position, said mark being in a known related proximity to the over-balanced part of said crank shaft.

21. A crank shaft balancing machine including a casing having means for rotatably supporting a crank shaft having an over-balance, a support for said casing, means for suspending said casing from said support, said casing being susceptible to movement by said over-balance during rotation of said crank shaft, a scale on said support, said scale being calibrated in terms of amplitude of the over-balance, and means movably mounted on said support and connected with said casing for directing a beam of light on said scale so as to indicate the limits of movement of said casing in terms of the amplitude of said over-balance.

22. A device of the class described comprising a support, a member movably mounted on said support including means for rotatably supporting a crank shaft for rotation relative to said member, a motor on said member, a coupling journaled in said member, and a yieldable friction pad in said coupling for engaging an extremity of said crank shaft, said coupling being operatively connected with said motor for rotating said crank shaft.

23. A device of the class described including a support, a member movably mounted on said support having means for rotatably supporting a crank shaft having an over-balance with respect to its axis for rotation relative to said member, said member being normally in stable equilibrium, an indicator adapted to disclose the respective positions through which said member is moved by said over-balance during rotation of said crank shaft, and an element on said crank shaft having indicia thereon for locating a point on said shaft which is in a known relation to the over-balanced part thereof when said means is in a predetermined position.

24. A crankshaft balancing machine including a casing, a rigid support for said casing, means for suspending said casing from said support bearings in said casing comprising a stationary jaw and a movable jaw for rotatably supporting a crank shaft, locking means for securing the movable jaws of said bearings in a closed position, a driving member for rotating said crank shaft, means for clamping the respectively opposite ends of said casing against movement relative to said support, and a control mechanism comprising a single operating lever, said control mechanism being adapted to actuate said movable jaws, driving member, locking mechanism, and clamping means in a predetermined sequence by repeated operations of said operating lever.

25. A crankshaft balancing machine including a support, a fulcrum on said support, a casing located below said fulcrum, means suspended from said fulcrum and attached to said casing for supporting substantially the entire weight of said casing and permitting bodily movement of the latter with respect to said support, apparatus independent of said weight supporting means for restraining a portion of said casing against movement relative to said support, members in said casing for rotatably supporting a crankshaft for rotation relative to said casing, and apparatus for measuring the amplitude of over balance of said crankshaft by the displacement of the unrestrained portion of said casing from a vertical axis through its restrained part during rotation of said crankshaft.

26. A crankshaft balancing machine including a support, a fulcrum on said support, a casing located below said fulcrum, means suspended from said fulcrum and attached to said casing for supporting substantially the entire weight of said casing and permitting bodily movement of the latter with respect to said support, clamping members for alternatively restraining the respectively opposite ends of said casing against movement relative to said support, members in said casing for rotatably supporting a crankshaft for rotation relative to said casing, and apparatus for measuring the amplitude of overbalance of said crankshaft by the displacement of the unrestrained portion of said casing from a vertical axis through its restrained part during rotation of said crankshaft.

27. A crankshaft balancing machine including a support having a rocker bar thereon, a casing having substantially all of its weight freely suspended from said rocker bar, clamping members spaced from said rocker bar for restraining an end of said casing against movement relative to said support and forming a fulcrum about which said casing is revoluble, members in said casing for rotatably supporting a crankshaft for rotation relative to said casing, and apparatus for measuring the amplitude of over balance of said crankshaft during rotation thereof.

28. A crankshaft balancing machine including a support having a rocker bar thereon, a casing having substantially all of its weight freely suspended from said rocker bar, clamping members spaced from said rocker bar for restraining an end of said casing against movement relative to said support and forming a fulcrum about which said casing is revoluble, members in said casing for rotatably supporting a crankshaft for rotation relative to said casing, apparatus for measuring the amplitude of over balance of said crankshaft during rotation thereof and mechanism for determining the location of said over balance on said crankshaft.

ROGER K. LEE.